United States Patent [19]

Suzuki et al.

[11] Patent Number: 4,775,453

[45] Date of Patent: Oct. 4, 1988

[54] SEPARATION METHOD OF BORON ISOTOPES

[75] Inventors: Kazuya Suzuki; Ginji Fujisawa, both of Mito; Atsushi Yokoyama, Tokaimura, all of Japan

[73] Assignee: Japan Atomic Energy Research Institute, Tokyo, Japan

[21] Appl. No.: 17,457

[22] Filed: Feb. 24, 1987

[30] Foreign Application Priority Data

Jul. 22, 1986 [JP] Japan ................................ 61-170876

[51] Int. Cl.$^4$ ............................................. B01D 59/34
[52] U.S. Cl. ............................ 204/157.22; 204/157.21
[58] Field of Search .................................... 204/157.22

[56] References Cited

U.S. PATENT DOCUMENTS

| | | | |
|---|---|---|---|
| 4,049,515 | 9/1977 | Robinson et al. | 204/157.22 |
| 4,088,553 | 5/1978 | Rockwood | 204/157.22 |
| 4,447,303 | 5/1984 | Jensen et al. | 204/157.2 |

OTHER PUBLICATIONS

Chem. Ab. 96(16):133033s, Li et al., *Jiguang* 1981. 8(4), 33–7 (ch.).
R. J. Jensen et al., IEEE J.Q.E. QE-16 p. 1352 (1980).
R. V. Ambartzumian et al., "Laser Spectroscopy" pp. 120–131, Springer-Verlag, New York (1975).
S. M. Freund et al., Chem. Phys. Lett., 32 No. 2 pp. 257–260 (1975).
K. Wada, Reza Kenkyu 4 pp. 225–233, 1976.

*Primary Examiner*—John F. Terapane
*Assistant Examiner*—Virginia B. Caress
*Attorney, Agent, or Firm*—Oblon, Fisher, Spivak, McClelland & Maier

[57] ABSTRACT

Boron isotopes are separated by a method comprising preparing a gaseous mixture from a gas containing an oxidizing gas as its main component and gaseous boron tribromide, and irradiating the gaseous mixture with light from an ammonia laser, thereby effecting separation of the boron isotopes of mass number 10($^{10}$B) and mass number 11($^{11}$B).

2 Claims, No Drawings

SEPARATION METHOD OF BORON ISOTOPES

BACKGROUND OF THE INVENTION

The present invention relates to a method of separating boron isotopes. More particularly, the present invention relates to the separation of boron of mass number 10 ($^{10}B$) and boron of mass number 11 ($^{11}B$).

$^{10}B$, one of the boron isotopes, is large as 3800 barns in thermal neutron absorption cross section and so is broad in use as a neutron absorber while $^{11}B$ is small as 0.005 barn. Thus, an effective separation method of $^{10}B$ and $^{11}B$ is desired in the field of atomic energy.

The prior industrial separation method of $^{10}B$ and $^{11}B$ is to utilize the dissociatin of boron trifluoride complex (e.g. boron trifluoride methyl ether complex $BF_3$—$(CH_3)_2O$ ), but the separation factor of $^{11}B$ is below 1.05 per stage.

DETAILED DESCRIPTION OF THE PREFERRED EMBODIMENT

An object of the present invention is to provide a more effective industrial method for separating $^{10}B$ and $^{11}B$.

As the result of diligent research for attaining this object, the present inventors could invented a separation method of boron isotopes comprising separating boron of mass number 10 ($^{10}B$) and boron of mass number 11 ($^{11}B$) by adding a gas containing an oxidizing gas as a main component to gaseous boron tribromide and irradiating with an infrared laser thereto, which is the present invention.

The present invention is to separate $^{10}B$ and $^{11}B$ by an irradiation of infrared laser on boron tribromide ($BBr_3$), and, as shown in Examples, is a very effective method.

Boron tribromide in natural composition is composed of a compound of boron of 10 in mass number ($^{10}BBr_3$) and another compound of boron of 11 in mass number ($^{11}BBr_3$). $^{10}B$ and $^{11}B$ can be separated by irradiating with an infrared laser on gaseous boron tribromide to excite or dissociate either one of $^{10}BBr_3$ and $^{11}BBr_3$ selectively, reacting it with an oxidizing gas to obtain a solid powder of oxide or oxide-bromide and removing it from the gas.

The present invention will be concretely explained with examples.

EXAMPLE 1

Oxygen (pressure 8 torr, volume 120 ml) was added to gaseous boron tribromide in natural composition ($^{10}B$ 19.0%, $^{11}B$ 81.0%) and 4000 pulses of ammonia laser (wave length 12.08$\mu$, power output 200 mj per pulse) were irradiated thereto. After irradiation, the composition of boron isotopes in gaseous boron tribromide was $^{10}B$ 5.7% and $^{11}B$ 94.3% and so $^{11}B$ was concentrated in the gas.

The separation factor of $^{11}B$ is:

$$(94.3/5.7)/(81.0/19.0)=3.88$$

EXAMPLE 2

Similarly, nitrogen monoxide (pressure 20 torr, volume 120 ml) was added to gaseous boron tribromide in natural composition (pressure 2 torr, volume 120 ml) and 4000 pulses of ammonia laser (wave length 12.08$\mu$, power output 200 mj per pulse) were irradiated thereto. After irradiation, the composition of boron isotopes is gaseous boron tribromide was $^{10}B$ 15.0% and $^{11}B$ 85.0% and so $^{11}B$ was concentrated.

The separation factor of $^{11}B$ is:

$$(85.0/15.0)/(81.0/19.0)=1.33$$

EXAMPLE 3

Oxygen (pressure 8 torr, volume 120 ml) was added to gaseous boron tribromide in natural composition (pressure 2 torr, volume 120 ml) and 4000 pulses of ammonia laser (power output per pulse: wavelength 12.26$\mu$, component 150 mj; and wave length 12.80$\mu$, component 100 mj) were irradiated thereto. After irradiation, the composition of boron isotopes in gaseous boron tribromide was $^{10}B$ 32.2% and $^{11}B$ 67.8% and so $^{11}B$ was concentrated.

The separation factor of $^{10}B$ is:

$$(32.2/67.8)/(19.0/81.0)=2.02$$

EXAMPLE 4

Oxygen (pressure 8 torr, volume 120 ml) was added to gaseous boron tribromide in natural composition (pressure 2 torr, volume 120 ml) and ammonia laser (power output per pulse: wave length 12.26$\mu$, component 150 mj; and wave length 12.80$\mu$, component 100 mj) and carbon dioxide gas laser (power output per pulse: wave length 9.29$\mu$, component 200 mj) were simultaneously irradiated thereto. After irradiation of 3000 pulses, the composition of boron isotope in gaseous boron tribromide was $^{10}B$ 46.1% and $^{11}B$ 53.9% and so $^{10}B$ was concentrated. The separation factor of $^{10}B$ is:

$$(46.1/53.9)/(19.0/81.0)=3.65$$

As is evident from the above Examples, either one of $^{10}B$ and $^{11}B$ can be effectively concentrated by changing the wave length of irradiation infrared laser.

What is claimed is:

1. A method of separating boron isotopes, comprising:
    preparing gaseous mixture from a gas containing an oxidizing gas as its main component and gaseous boron tribromide; and
    irradiating said gaseous mixture with light of multiple wavelengths from an ammonia laser, thereby effecting separation of the boron isotopes of mass number 10 ($^{10}B$) and mass number 11 ($^{11}B$).

2. The method of claim 1, wherein said oxidizing gas is oxygen.

* * * * *